(12) United States Patent
Barella et al.

(10) Patent No.: US 7,837,745 B2
(45) Date of Patent: Nov. 23, 2010

(54) HIGH ENERGY CELL FUSIBLE LINK

(75) Inventors: Joseph Barella, Yonkers, NY (US);
Wayne Andruk, Yonkers, NY (US)

(73) Assignee: International Battery, Inc., Allentown, PA (US)

( * ) Notice: Subject to any disclaimer, the term of this patent is extended or adjusted under 35 U.S.C. 154(b) by 882 days.

(21) Appl. No.: 11/739,689

(22) Filed: Apr. 24, 2007

(65) Prior Publication Data

US 2009/0320277 A1    Dec. 31, 2009

(51) Int. Cl.
  H01M 6/00 (2006.01)
  H01M 2/00 (2006.01)
  H01M 2/02 (2006.01)
  H01M 10/38 (2006.01)
  H01H 85/04 (2006.01)

(52) U.S. Cl. ............... 29/623.1; 429/65; 429/178; 429/123; 337/159

(58) Field of Classification Search ........... 29/623.1; 429/65, 180, 185, 123, 178; 337/159, 187
See application file for complete search history.

(56) References Cited

U.S. PATENT DOCUMENTS 5,825,274 A * 10/1998 Totsuka .............. 337/190
6,902,434 B2 * 6/2005 Stack ............... 439/620.28

* cited by examiner

*Primary Examiner*—Patrick Ryan
*Assistant Examiner*—Thomas H. Parsons
(74) *Attorney, Agent, or Firm*—Design IP

(57) ABSTRACT

A means and method for rendering high energy density cells safe in compliance with transportation requirements, with the incorporation of a cell fusible terminal which is added on or incorporated within the cell terminals to prevent over current and hazards from developing due to external short circuits. As a result, cells made in accordance with the method of the present invention can be shipped by common carriers even though they are classified as hazardous materials and can be readily used and normally discharged with such fusible link element thereon. The fusible terminal comprises a non conductive base element upon which is mounted a fusible link element and wherein the non-conductive or insulative base element comprises means for connection to a terminal of the cell or battery and to an external component.

5 Claims, 4 Drawing Sheets

HIGH ENERGY CELL FUSIBLE LINK

FIELD OF THE INVENTION

This invention relates to safety devices for high energy cells and particularly to fusible link type circuit interrupters.

BACKGROUND OF THE INVENTION

High energy cells are designed to produce large amounts of energy over reasonable periods of time (1-10 hours) at moderate current drains. As a result, when abused as cells, such as with short circuiting, these cells can produce extremely high currents. If "shorted" for extended time (typically greater than 1 minute, depending upon available heat dissipation) cells temperatures can increase dramatically to combustion temperatures and the cells may burst into flame. Currently commercially available high energy cells typically range from 50-1000 ahrs and when a fully charged cell is directly hard shorted the cell may flame. Obviously, this cell response is not desired, especially in view of many transportation regulation restrictions of hazardous materials. As a result, such cells are precluded from being transported under the provision of 49 CFR 173.185. Lithium cells are precluded from being transported unless they conform to certain provision, one of which is the UN recommendations for the Transportation of Hazardous Goods, Manual of tests and Criteria ST/SG/AC.10/Rev. 4, section 38.3, Lithium Batteries, Tests T1-T6 inclusive and (T8), to provide the cells with limited short circuit output yet have the ability of normal discharge.

SUMMARY OF THE INVENTION

It is accordingly an object of the present invention to provide a method and means for rendering high energy density cells compliant under safety regulation with making them substantially inert to external short circuiting conditions.

This and other objects, features and advantages of the present invention will become more evident from the following discussion and drawings in which:

SHORT DESCRIPTION OF THE DRAWINGS

SUMMARY OF THE INVENTION

This invention relates to a means and method for rendering high energy density cells safe in compliance with transportation requirements, with the incorporation of a cell fusible terminal which is added on or incorporated within the cell terminals to prevent over current and hazards from developing due to external short circuits. As a result, cells made in accordance with the method of the present invention can be shipped by common carriers even though they are classified as hazardous materials and can be readily used and normally discharged with such fusible link element thereon.

Generally the fusible terminal comprises a non conductive base element upon which is mounted a fusible link element and wherein the non-conductive or insulative base element comprises means for connection to a terminal of the cell or battery and to an external component.

The terminal or fuse base can be made of various insulating materials as compared to the fuse material such that the majority of current during an external short condition is directed through the fuse material. The fuse material can be comprised of materials such as steel or nickel whereby under high current drain the notched and/or coined area resistance cause a temperature rise in the material and a burning or melting open thereby stopping the current before a hazard or thermal runaway is experienced. This invention can be used on cells put into battery configurations or removed if desired given that most battery designs incorporate over current prevention or protection devices on the cell terminals.

DETAILED DESCRIPTION OF THE INVENTION AND THE DRAWINGS

Figure 1:
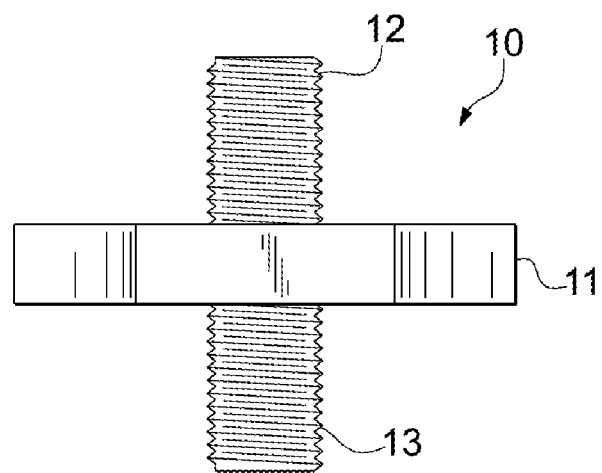
FIG. 1 is a side view of the nonconductive nut element, with integrated non conductive threaded bolt elements extending therefrom, of the fuse element of the present invention.
Figure 2:
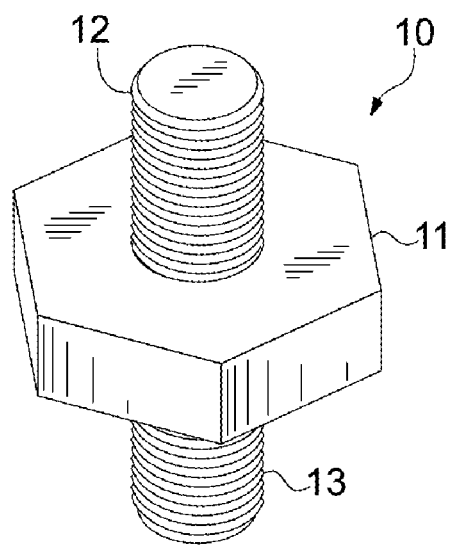
FIG. 2 is an isometric view of the nut with extending bolt elements of FIG. 1.
Figure 6:
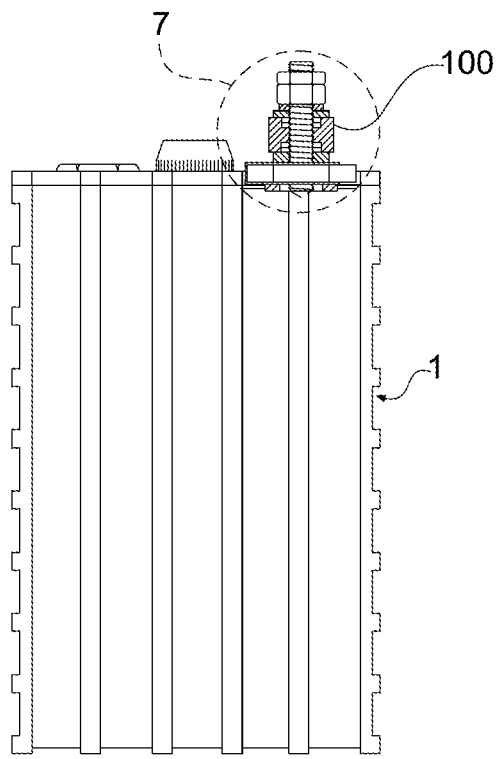
FIG. 6 is a side view showing a high energy cell with the fusible link safety device attached to the positive terminal thereof.

With specific reference to the drawings, the fusible link base element 10 shown in FIGS. 1 and 2 comprises a nut element 11 to which are integrated threaded connecting elements 12 and 13 adapted to be threadingly engaged to the cell or battery 1 shown in FIG. 6 and to an external device powered thereby, respectively. The nut element 11 and the threaded elements 12 and 13 are insulative and preferably comprised of a plastic such as nylon.

Figure 3:
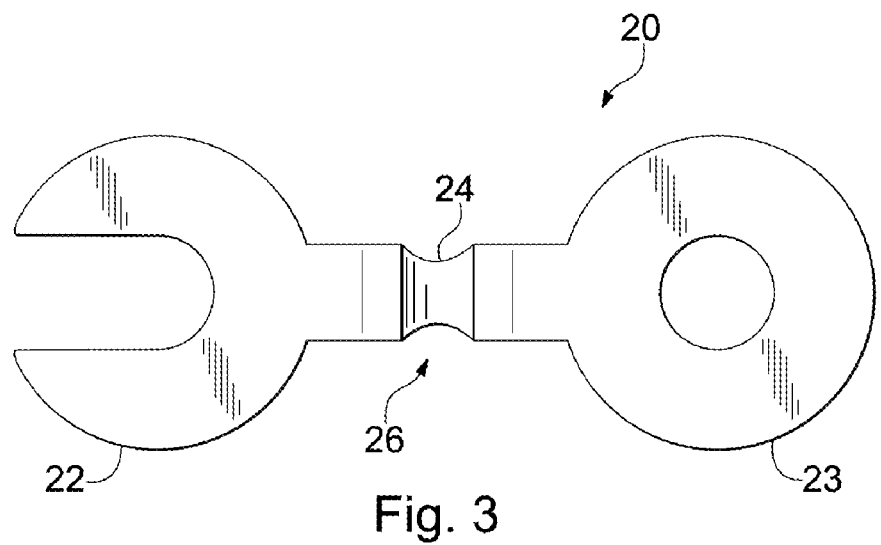
FIG. 3 is a top view of the fusible link element.
Figure 4:
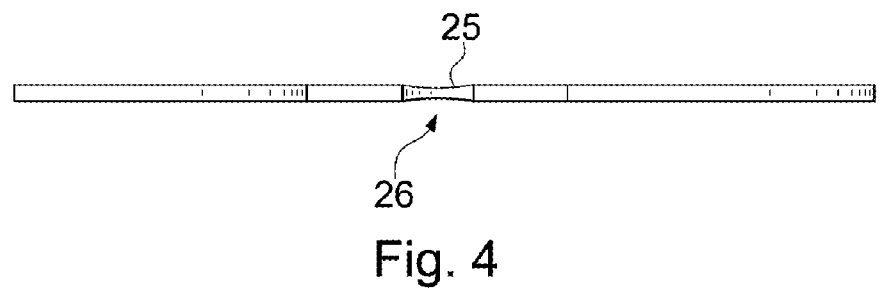
FIG. 4 is a side view of the fusible link of FIG. 3, depicting the coining thereof.

Conductive fusible link element 20 show in FIGS. 3 and 4 comprises engaging element 22 and 23 for engagement with threaded elements 12 and 13 respectively and are shown as being in spade and ring formations.

Figure 5A:
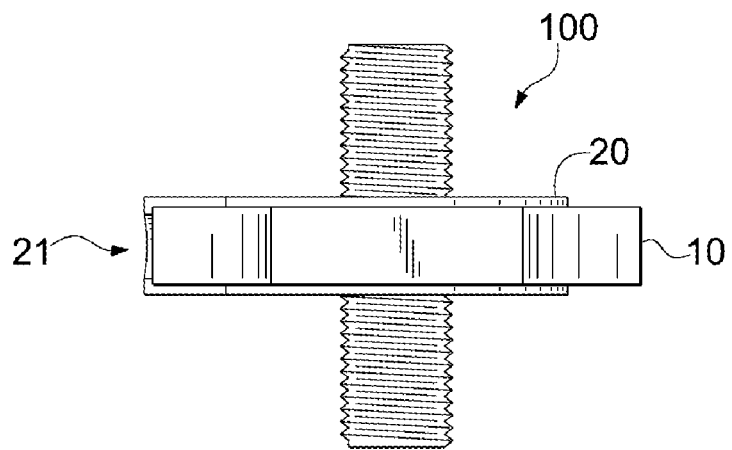
FIGS. 5a and 5b are side and isometric views of the emplacement of the fusible link element on the base elements of FIGS. 1 and 2.
Figure 5B:
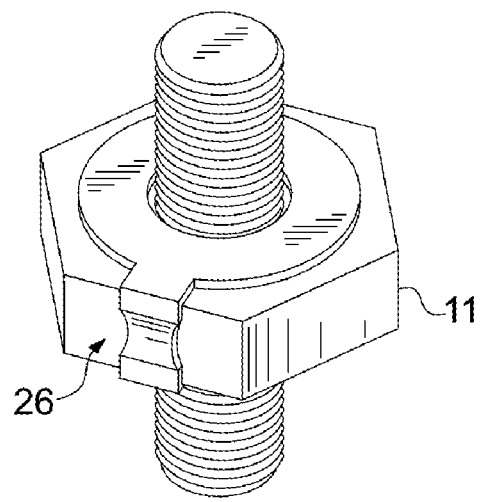

In FIGS. 5a and 5b, the fusible link device 100 is shown with the fusible link element 20 being folded on and emplaced on base 10 with the connecting section 21 is shown as being notched 24 and coined 25 to provide a high resistance bridge such that excessive current with concomitant heat, which builds up with short circuiting, melts the link and stops cell discharge. The extent of notching and coining is adapted to provide a predetermined cutoff temperature before the fusible link is broken. The coined and notched area 26 is shown in FIG. 5b as being adjacent to and supported by the insulative nut element 11.

Figure 7:
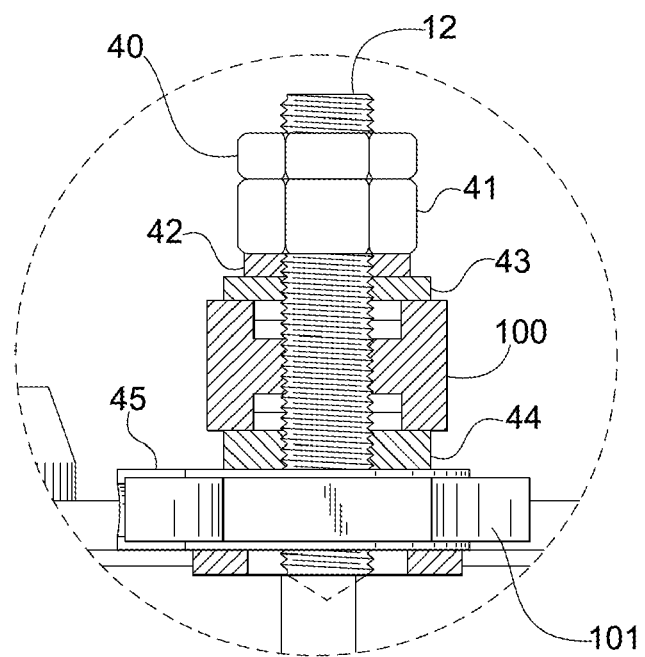
FIG. 7 is an enlarged view of section A of FIG. 6.

FIG. 6 shows the fusible link device 100 on the positive terminal 101 of a battery 1 with FIG. 7 showing the various connection elements of backing nut 40, nut 41, lock washer 42, flat washer 43, washer 44, terminal insulator 45. The battery 1 is thus protected which being available for use in full compliance with the transportation safety regulation.

It is understood that the above description and drawings are only illustrative of the present invention and that changes may be made in structure and components without departing from the scope of the present invention as defined in the following claims.

What is claimed is:

1. A method for rendering a high energy cell, subject to detrimental short circuiting conditions, sufficiently safe for the transport thereof on common carriers, said method comprising the step of:

emplacing a fusible link element on a terminal of said cell, wherein said fusible link element comprises an insulative base element integrated with insulative means for connecting the insulative base element to the cell and a device powered thereby and wherein said fusible link element further comprises a conductive fusible element having means for the melting and breaking thereof upon high temperature short circuiting conditions with concomitant opening of a circuit, wherein said fusible element is adapted to be placed on said insulative base element for adjacent electrical contact with a terminal of said cell and said powered device.

2. A method for coupling a fuse to a battery terminal, said method comprising the steps of:
 (a) providing a fusible link element having a first engaging element located on a first side of an insulative nut element and a second engaging element located on an opposing side of the insulative nut element, the fusible link having a connecting section connecting the first engaging element and the second engaging element, the insulative nut element having a first insulative post portion extending from the first side thereof and
 (b) coupling the first insulative post portion to the battery terminal.

3. The method according to claim 2, wherein the insulative nut element further comprises a second insulative post portion extending from the second side thereof, the method further comprising the step of:
 (c) connecting an external component to the second insulative post portion.

4. A method for rendering a high energy cell, subject to detrimental short circuiting conditions, sufficiently safe for the transport thereof on common carriers, said method comprising the steps of:
 (a) providing an electrically insulative element comprising:
  a nut element having a first side and an opposing second side;
  a first post portion extending from the first insulative side; and
  a second post portion extending from the second insulative side;
 (b) applying a fusible link element to the electrically insulative element; and
 (c) coupling the electrically insulative element to a terminal of the cell such that the fusible link element is electrically coupled to a terminal of the high energy cell.

5. the method according to claim 4, wherein step (c) comprises coupling the first post portion to the terminal.

* * * * *